(12) United States Patent
Lee et al.

(10) Patent No.: US 11,650,395 B2
(45) Date of Patent: May 16, 2023

(54) FIXED FOCAL IMAGING LENS

(71) Applicant: Rays Optics Inc., Hsinchu County (TW)

(72) Inventors: Chen-Cheng Lee, Hsinchu County (TW); Yu-Chia Lu, Hsinchu County (TW); Ju-Hsin Yang, Hsinchu County (TW)

(73) Assignee: Rays Optics Inc., Hsinchu County (TW)

(*) Notice: Subject to any disclaimer, the term of this patent is extended or adjusted under 35 U.S.C. 154(b) by 619 days.

(21) Appl. No.: 16/683,219

(22) Filed: Nov. 13, 2019

(65) Prior Publication Data

US 2021/0026104 A1 Jan. 28, 2021

(30) Foreign Application Priority Data

Jul. 26, 2019 (TW) ................ 108126514

(51) Int. Cl.
*G02B 9/34* (2006.01)
*G02B 3/04* (2006.01)
G02B 27/00 (2006.01)
G02B 13/18 (2006.01)
G02B 3/02 (2006.01)
G02B 9/62 (2006.01)
(Continued)

(52) U.S. Cl.
CPC ................ *G02B 9/34* (2013.01); *G02B 3/04* (2013.01); *G02B 3/02* (2013.01); *G02B 9/42* (2013.01); *G02B 9/62* (2013.01); *G02B 9/64* (2013.01); *G02B 13/18* (2013.01); *G02B 27/0025* (2013.01)

(58) Field of Classification Search
CPC . G02B 9/34; G02B 3/04; G02B 13/18; G02B 9/42; G02B 9/62; G02B 9/64; G02B 3/02; G02B 27/0025
USPC ................ 359/649, 679–682, 708, 713, 740, 359/749–752, 754–756, 761, 762
See application file for complete search history.

(56) References Cited

U.S. PATENT DOCUMENTS

| 1,955,591 A | 4/1934 | Horace | |
|---|---|---|---|
| 2008/0158693 A1* | 7/2008 | Kang | .................... G02B 13/18 359/708 |

(Continued)

FOREIGN PATENT DOCUMENTS

| CN | 109557644 | 4/2019 | |
|---|---|---|---|
| EP | 3282298 A1 * | 2/2018 | ......... G02B 13/0045 |

(Continued)

*Primary Examiner* — Evelyn A Lester
(74) *Attorney, Agent, or Firm* — JCIPRNET

(57) ABSTRACT

A fixed focal imaging lens includes two lens sets and an aperture stop. One of the two lens sets is disposed between a magnified side and the aperture stop. The other one of the two lens sets is disposed between the aperture stop and a minified side. The lens set disposed between the magnified side and the aperture stop includes an aspheric lens and a compound lens, wherein the aspheric lens is a lens closest to the magnified side in the lens set, and the compound lens includes a plurality of lenses combined together. The lens set disposed between the aperture stop and the minified side includes a compound lens and an aspheric lens, wherein the compound lens includes a plurality of lenses combined together, and the aspheric lens is a lens closest to the minified side in the lens set.

18 Claims, 3 Drawing Sheets

(51) Int. Cl.
*G02B 9/42* (2006.01)
*G02B 9/64* (2006.01)

(56) References Cited

U.S. PATENT DOCUMENTS

| | | | |
|---|---|---|---|
| 2012/0033300 A1* | 2/2012 | Nakahara | G02B 27/64 |
| | | | 359/557 |
| 2012/0081799 A1* | 4/2012 | Tseng | G02B 13/18 |
| | | | 359/713 |
| 2013/0057972 A1* | 3/2013 | Lee | G02B 13/04 |
| | | | 359/749 |
| 2013/0141629 A1* | 6/2013 | Yoshinaga | G02B 13/18 |
| | | | 359/708 |
| 2013/0148006 A1* | 6/2013 | Yoshinaga | H04N 5/2254 |
| | | | 359/708 |
| 2019/0302428 A1* | 10/2019 | Chen | G02B 5/005 |
| 2020/0249418 A1* | 8/2020 | Chang | G02B 13/16 |
| 2021/0011258 A1* | 1/2021 | Gao | G02B 13/0045 |

FOREIGN PATENT DOCUMENTS

| | | | | |
|---|---|---|---|---|
| JP | 2018109755 | * | 7/2018 | G02B 13/18 |
| TW | I644123 | | 12/2018 | |

* cited by examiner

FIXED FOCAL IMAGING LENS

CROSS-REFERENCE TO RELATED APPLICATION

This application claims the priority benefit of Taiwan application serial no. 108126514, filed on Jul. 26, 2019. The entirety of the above-mentioned patent application is hereby incorporated by reference herein and made a part of this specification.

BACKGROUND

Technical Field

The present invention relates to an optical lens and in particular relates to a fixed focal imaging lens.

Description of Related Art

In order to achieve a specification of an imaging lens under the requirements for high specification and high resolution, a lens structure corresponding to the imaging lens is generally relatively complex. Thus, an additionally derived problem is a high process tolerance requirement level, furthermore, production difficulty is caused, in addition, the problem of poor yield caused by a high tolerance requirement is easy to generate, so that the selling price of a product is kept at a high level, and the product is lack of competitiveness.

SUMMARY

The present invention provides a fixed focal imaging lens which is relatively simple in structure and relatively low in sensitivity to assembly and production error, so that the lens is easy to produce, and the production cost is also reduced.

One embodiment of the present invention provides a fixed focal imaging lens including two lens sets and an aperture stop. One of the two lens sets is disposed between a magnified side and the aperture stop. The other one of the two lens sets is disposed between the aperture stop and a minified side. The lens set disposed between the magnified side and the aperture stop includes an aspheric lens and a compound lens sequentially arranged from the magnified side to the minified side, where the aspheric lens is a lens closest to the magnified side in the lens set, and the compound lens includes a plurality of lenses combined together. The lens set disposed between the aperture stop and the minified side includes a compound lens and an aspheric lens sequentially arranged from the magnified side to the minified side, where the compound lens includes a plurality of lenses combined together, and the aspheric lens is a lens closest to the minified side in the lens set. In addition, the number of lenses with refractive power in the fixed focal imaging lens is 6-8, and the number of aspheric lenses in the fixed focal imaging lens is 2 or 3. Moreover, a distance between every two adjacent lenses in the fixed focal imaging lens is fixed during focusing.

An embodiment of the present invention provides a fixed focal imaging lens including one aspheric lens, two compound lenses and another aspheric lens sequentially arranged from a magnified side to a minified side. In addition, the fixed focal imaging lens further includes an aperture stop disposed between the two compound lenses. In the lens, the aspheric lens close to the magnified side is closest to the magnified side in the fixed focal imaging lens. Each of the two compound lenses includes a plurality of lenses combined together. The aspheric lens close to the minified side is closest to the minified side in the fixed focal imaging lens. In addition, the number of lenses with refractive power in the fixed focal imaging lens is 6-8, and the number of aspheric lenses in the fixed focal imaging lens is 2 or 3. Moreover, a distance between every two adjacent lenses in the fixed focal imaging lens is fixed during focusing.

In the fixed focal imaging lens according to the embodiments of the present invention, as a structure with two compound lenses, 2 or 3 aspheric lenses and one aperture stop is adopted, the fixed focal imaging lens is relatively simple in structure and relatively low in sensitivity to assembly and production error, so that the lens is easy to produce, the lens assembly yield is high, and the production cost is also reduced.

In order to make the aforementioned and other objectives and advantages of the present invention comprehensible, embodiments accompanied with figures are described in detail below.

DESCRIPTION OF THE EMBODIMENTS

Figure 1:
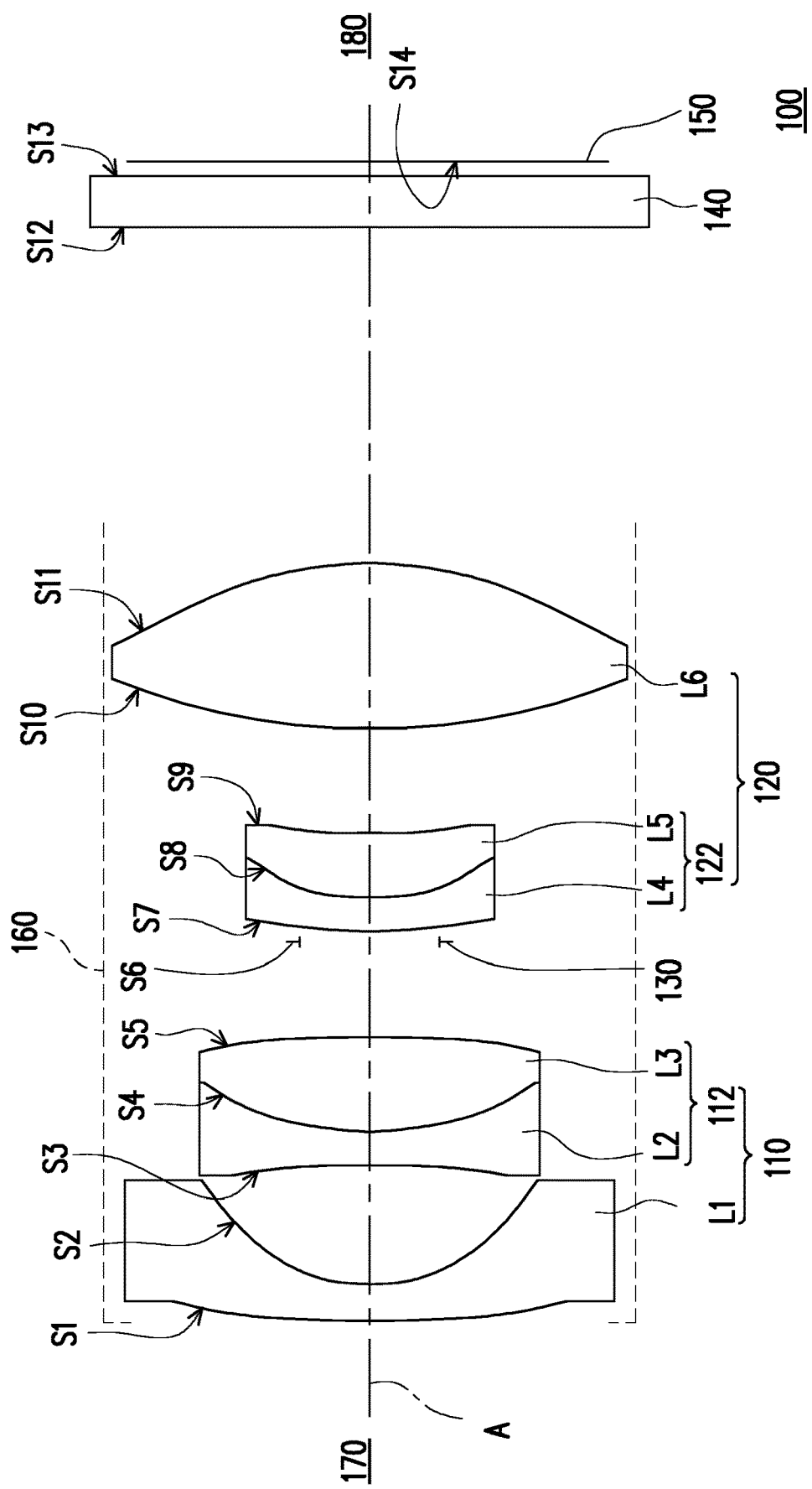
FIG. 1 is a schematic cross-sectional view of a fixed focal imaging lens according to an embodiment of the present invention.

FIG. 1 is a schematic cross-sectional view of a fixed focal imaging lens according to an embodiment of the present invention. Referring to FIG. 1, in the present embodiment, the fixed focal imaging lens 100 includes a lens set 110, a lens set 120 and an aperture stop 130.

In the present embodiment, the lens set 110 (which may be called a first lens set) includes a lens L1 (which is an aspheric lens and may also be called a first aspheric lens) and a compound lens 112 (which may be called a first compound lens). The lens set 120 (which may be called a second lens set) includes a compound lens 122 (which may be called a second compound lens) and a lens L6 (which is an aspheric lens and may also be called a second aspheric lens).

In the present embodiment, the lens L1 is a glass molded lens. The compound lens 112 is formed by a lens L2 and a lens L3. The compound lens 122 is formed by a lens L4 and a lens L5. The lens L6 is a glass molded lens. The number of the lenses with refractive power in the fixed focal imaging lens 100 is 6-8. In the present embodiment, the number of the lenses with refractive power in the fixed focal imaging lens 100 is 6. However, in other examples in which the number of the lenses with refractive power in the fixed focal imaging lens is 7 or 8, each lens such as the lens L6 in the fixed focal imaging lens 100 may be formed by two or three equivalent lenses. In addition, the material of the lenses L2, L3, L4 and L5 is glass. In other words, the material of all the lenses in the fixed focal imaging lens 100 is glass.

Each of the compound lens 112 and the compound lens 122 may be a cemented lens respectively, but is not limited thereto in the present invention. The lens L2 and the lens L3 in the compound lens 112 and the lens L4 and the lens L5 in the compound lens 122 may also be fixed in other ways (for example, fixed by a fixing frame or superposed by other mechanisms) so as to be connected along an optical axis A of the fixed focal imaging lens 100.

In the present embodiment, the lens set 110 has a negative refractive power; in other words, the lens L1 and the compound lens 112 overall have the negative refractive power. The lens set 120 has a positive refractive power; in other words, the compound lens 122 and the lens L6 overall have the positive refractive power. The compound lens 112 has a positive refractive power, while the compound lens 122 has a negative refractive power. In addition, the refractive power of the lens L1, the lens L2, the lens L3, the lens L4, the lens L5 and the lens L6 are sequentially negative, negative, positive, negative, positive and positive.

In the present embodiment, the lens set 110 is disposed between a magnified side 170 and the aperture stop 130, and the magnified side 170 may be a ray input side of the fixed focal imaging lens 100. The lens set 120 is disposed between the aperture stop 130 and a minified side 180, and the minified side 180 may be an imaging side of the fixed focal imaging lens 100, and an image sensor 150 may be disposed at the side. In addition, the lens L1, the lens L2, the lens L3, the lens L4, the lens L5 and the lens L6 are sequentially arranged from the magnified side 170 to the minified side 180 along the optical axis A.

In addition, the fixed focal imaging lens 100 focuses by moving the whole lens; namely, a distance between every two adjacent lenses in the fixed focal imaging lens 100 is fixed during focusing. In other words, the lens set 110, the aperture stop 130 and the lens set 120 of the fixed focal imaging lens 100 as a whole move relative to an imaging surface or the image sensor 150 where the imaging surface is located during focusing, while the lens set 110, the aperture stop 130 and the lens set 120 do not move relatively.

In the present embodiment, the diameter of the lens (such as the lens L1) closest to the magnified side 170 is smaller than that of the lens (such as the lens L6) closest to the minified side 180 in the fixed focal imaging lens 100. In such a way, in other words, the maximum chief ray angle of the fixed focal imaging lens 100 may be relatively small to conform to the specification of the image sensor 150. In addition, in an embodiment, the maximum thickness of the lens L6 in the direction of the optical axis A is preferably 1.5 times or more of the minimum thickness of the lens L1 in the direction of the optical axis A; thus, a relatively large refractive power may be achieved, and the use number of the lenses is reduced. When the maximum thickness of the lens L6 in the direction of the optical axis A is 2 times or more of the minimum thickness of the lens L1 in the direction of the optical axis A, the better effect of reducing the use number of the lenses is achieved. In the present embodiment, the maximum thickness of the lens L6 in the direction of the optical axis A is 3 times or more of the minimum thickness of the lens L1 in the direction of the optical axis A (namely, the thickness of the lens L6 in the direction of the optical axis A is 3 times or more of the thickness of the lens L1 in the direction of the optical axis A in the present embodiment). Or, in the fixed focal imaging lens 100 according to the present embodiment, as a structure with two compound lenses, 2 or 3 aspheric lenses and one aperture stop 130 is adopted, the fixed focal imaging lens 100 is relatively simple in structure and relatively low in sensitivity to assembly and production error, so that the lens is relative easy to produce, the lens assembly yield is high, and the production cost is also reduced. In addition, the fixed focal imaging lens 100 is relatively low in sensitivity to assembly and production error, namely assembly with a relatively large tolerance may be allowed, and therefore, a lens barrel 160 with a relatively large tolerance value may be fitted. In the present embodiment, the material of the lens barrel 160 accommodating the lenses L1-L6 is metal, and the lens barrel 160 may be produced by lathe machining.

In the present embodiment, the fixed focal imaging lens 100 meets the condition that TL<20 mm, where TL is a distance from a surface (namely a surface S1), facing towards the magnified side 170, of the lens closest to the magnified side 170 to the surface (namely a surface S11), facing towards the minified side 180, of the lens closest to the minified side 180 in the fixed focal imaging lens 100 on the optical axis A of the fixed focal imaging lens 100. In addition, in the present embodiment, the fixed focal imaging lens 100 meets the condition that 1≤|TL/EFL|≤10. In an embodiment, the fixed focal imaging lens 100 may further meet the condition that 2≤|TL/EFL|≤5, for example, |TL/EFL|=2.88.

In the present embodiment, the actual design of each aforementioned component may refer to Table I below.

TABLE I

| Component | Surface | Curvature radius (mm) | Interval (mm) | Refractive index (Nd) | Abbe number (Vd) |
|---|---|---|---|---|---|
| Lens L1 | S1 | Infinite | 0.53 | 1.67 | 54.78 |
| | S2 | 3.00 | 1.75 | | |
| Lens L2 | S3 | −15.00 | 0.50 | 1.50 | 81.61 |
| Lens L3 | S4 | 4.60 | 1.42 | 2.00 | 29.13 |
| | S5 | −15.00 | 1.42 | | |
| Aperture stop 130 | S6 | Infinite | 0.15 | | |
| Lens L4 | S7 | 10.00 | 0.50 | 1.99 | 16.48 |
| Lens L5 | S8 | 3.00 | 0.95 | 1.88 | 40.77 |
| | S9 | 8.66 | 1.55 | | |
| Lens L6 | S10 | 8.75 | 2.47 | 1.67 | 54.78 |
| | S11 | −5.22 | 5.01 | | |
| Cover glass 140 | S12 | Infinite | 0.75 | 1.52 | 64.17 |
| | S13 | Infinite | 0.20 | | |
| Image sensor 150 | S14 | Infinite | | | |

Refer to FIG. 1 and Table I at the same time. Specifically, in the fixed focal imaging lens 100 according to the present embodiment, the lens L1 sequentially has a surface S1 and a surface S2 from the magnified side 170 to the minified side 180, the lens L2 sequentially has a surface S3 and a surface S4 from the magnified side 170 to the minified side 180, and the rest may be deduced by analogy, and a surface corresponding to each component is omitted herein. Imaging surfaces of the aperture stop 130 and the image sensor 150 are respectively denoted by a surface S6 and a surface S14, and the curvature radiuses of the imaging surfaces are infinite (namely a plane vertical to the optical axis A); the lens L2 and the lens L3 have the common surface S4, and the lens L4 and the lens L5 have a common surface S8, which means that the lens L2 and the lens L3 are two lenses mutually connected along the optical axis A or a cemented doublet lens, and the lens L4 and the lens L5 are two lenses mutually connected along the optical axis A or a cemented doublet lens. Cover glass 140 has a surface S12 and a surface S13, is disposed between the lens L6 and the image sensor 150, and is used for protecting the image sensor 150.

In addition, the interval in Table I is an interval from the surface at the magnified side 170 to the next surface at the minified side 180, for example, the thickness of the lens L1 is 0.53 mm, a distance from the lens L1 to the lens L2 is 1.75 mm, the thickness of the lens L2 is 0.50 mm, and the rest may be deduced by analogy, and the descriptions thereof are omitted herein.

Therein the curvature radius of the surface S1 of the lens L1 is infinite, the curvature radius of the surface S2 of the lens L1 is positive, and therefore, the lens L1 is a planconcave lens, where the positive curvature radius represents for deviation of the center of the surface towards the magnified side 170, just like the surface S2. The curvature radius of the surface S3 of the lens L2 is negative, the curvature radius of the surface S4 of the lens L2 is positive, and therefore, the lens L2 is a biconcave lens, where the negative curvature radius represents for deviation of the center of the surface towards the minified side 180, just like the surface S4. The rest may be deduced by analogy, e.g., the lens L3 is a biconvex lens. The curvature radius of the surface S7 of the lens L4 is positive, the curvature radius of the surface S8 of the lens L4 is positive, the absolute value of the curvature radius of the surface S7 is larger than that of the surface S8, and therefore, the lens L4 is a negative meniscus lens of which the convex surface faces towards the magnified side 170. The rest may be deduced by analogy, e.g., the lens L5 is a positive meniscus lens of which the convex surface faces towards the magnified side 170; and the lens L6 is a biconvex lens.

In the present embodiment, the fixed focal imaging lens 100 has the EFL being 3.893 mm, the f-number (F#) being 3 and the TTL being 17.197 mm, where TTL is a distance from the surface Si of the lens L 1 to the surface S14 of the image sensor 150 on the optical axis A. In addition, the maximum chief ray angle of the fixed focal imaging lens 100 is 10.8634 degrees. In addition, in the present embodiment, the lens L6 has the external diameter being 8 mm, the thickness on the optical axis A being 2.47 mm, and the edge thickness being 0.869 mm. The edge thickness means the thickness measured at the outmost side of the whole lens in the direction of the optical axis.

Quadric surface coefficient values K and different-order aspheric surface coefficients of the surface S1 and the surface S2 of the lens L1 as well as the surface S10 and the surface S11 of the lens L6 are listed in Table II below. An aspheric surface polynomial may be expressed by the following formula:

$$x = \frac{c'y^2}{1+\sqrt{1-(1+K)c'^2 y^2}} + Ay^2 + Ay^4 + By^6 + Cy^8 + Dy^{10} + Ey^{12} + Fy^{14} + Gy^{16}. \quad (1)$$

Therein, x is a sag in the direction of an optical axis I, c' is a reciprocal of a radius of an osculating sphere, namely a reciprocal of the curvature radius of a part close to the optical axis, K is a quadric surface coefficient, and y is an aspheric surface height, namely a height from the center of the lens to the edge of the lens. A-G respectively represent for different-order aspheric coefficients of the aspheric surface polynomial.

TABLE II

| Aspheric coefficient | | | | |
|---|---|---|---|---|
| | Surface S1 | Surface S2 | Surface S10 | Surface S11 |
| K | 0 | 0 | 0 | 0 |
| A | 1.4932E−02 | 1.8624E−02 | −1.6853E−03 | 1.2462E−03 |
| B | −4.1771E−03 | −3.9721E−03 | 1.9612E−04 | 4.6028E−05 |
| C | 8.0631E−04 | 5.6710E−04 | −1.9044E−05 | 4.0734E−07 |
| D | −1.0805E−04 | −4.0620E−05 | 1.1480E−06 | −6.6048E−08 |

TABLE II-continued

| Aspheric coefficient | | | | |
|---|---|---|---|---|
| | Surface S1 | Surface S2 | Surface S10 | Surface S11 |
| E | 9.3356E−06 | −1.6740E−07 | −2.7479E−08 | 6.4305E−09 |
| F | −4.6353E−07 | | | |
| G | 9.9923E−09 | | | |

A fixed focus lens according to another embodiment of the present invention will be described below, and the actual design of each component may refer to Table III below.

TABLE III

| Component | Surface | Curvature radius (mm) | Interval (mm) | Refractive index (Nd) | Abbe number (Vd) |
|---|---|---|---|---|---|
| Lens L1 | S1 | 200.00 | 0.99 | 1.67 | 54.78 |
| | S2 | 3.83 | 1.27 | | |
| Lens L2 | S3 | −20.17 | 0.50 | 1.50 | 81.61 |
| Lens L3 | S4 | 4.39 | 2.26 | 2.00 | 19.32 |
| | S5 | −39.90 | 0.19 | | |
| Aperture stop 130 | S6 | Infinite | 0.31 | | |
| Lens L4 | S7 | −5.13 | 0.45 | 1.99 | 16.48 |
| Lens L5 | S8 | 6.73 | 1.07 | 1.88 | 40.77 |
| | S9 | −6.73 | 1.18 | | |
| Lens L6 | S10 | 10.00 | 2.56 | 1.67 | 54.78 |
| | S11 | −4.83 | 5.88 | | |
| Cover glass 140 | S12 | Infinite | 0.75 | 1.52 | 64.17 |
| | S13 | Infinite | 0.20 | | |
| Image 150 | S14 | Infinite | | | |

Figure 2:
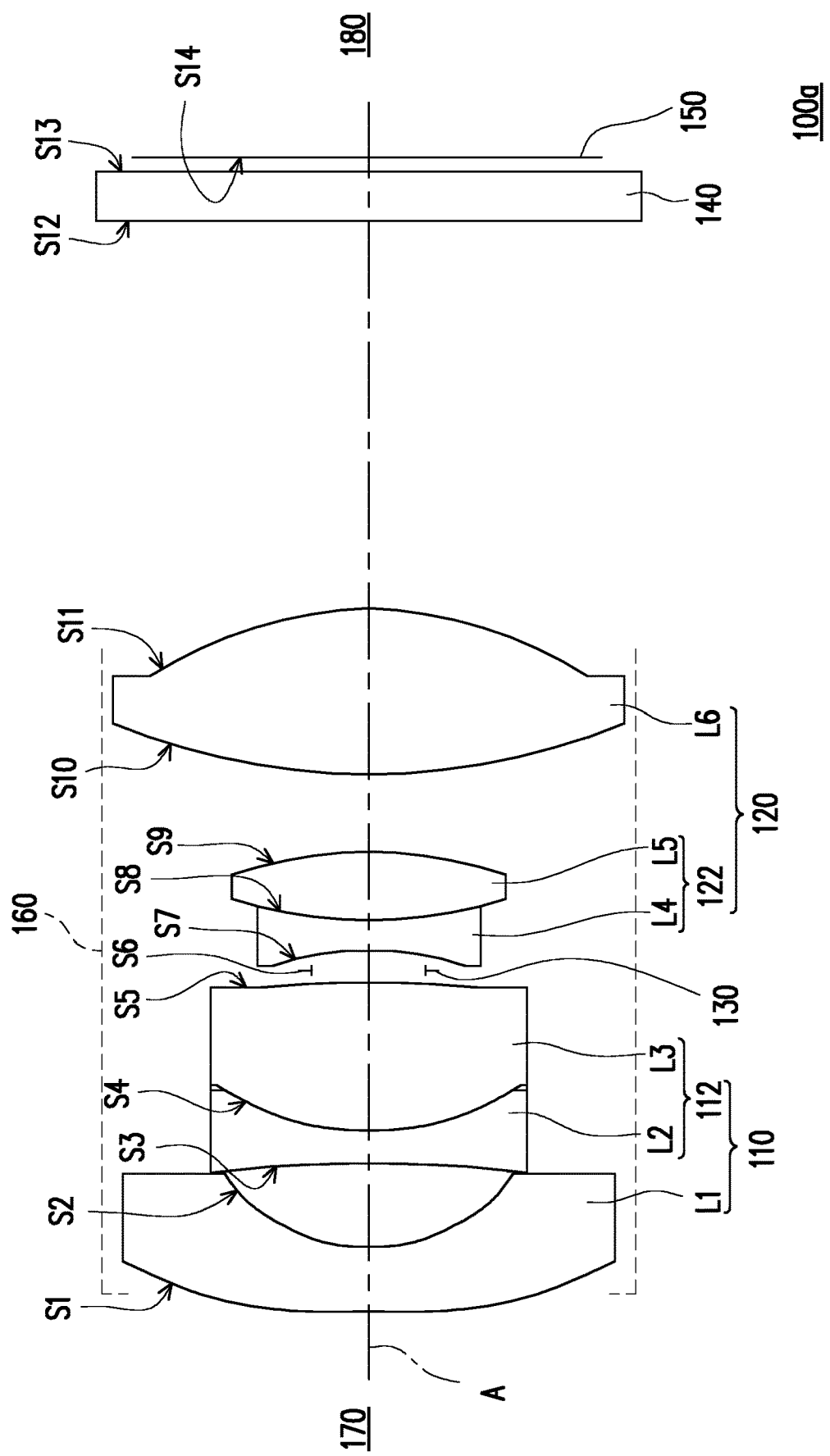
FIG. 2 is a schematic cross-sectional view of a fixed focal imaging lens according to another embodiment of the present invention.

FIG. 2 is a schematic cross-sectional view of a fixed focal imaging lens according to another embodiment of the present invention. Referring to FIG. 2 and Table III at the same time, in the fixed focal imaging lens 100a according to the embodiment, the lens L1 is a negative meniscus lens of which the convex surface faces towards the magnified side 170; the lens L2 is a biconcave lens; the lens L3 is a biconvex lens; the lens L4 is a biconcave lens; the lens L5 is a biconvex lens; and the lens L6 is a biconvex lens. The lens L1 and the lens L6 are aspheric lenses.

In the embodiment of Table III, the fixed focal imaging lens 100a has the EFL being 3.934 mm, the f-number being 2.95, the TTL being 17.597 mm and the maximum chief ray angle being 9.934 degrees. All the lenses L1-L6 are glass. The lens L1 and the lens L6 are glass molded lenses. The lens L6 has the external diameter being 8.15 mm, the thickness on the optical axis A being 2.562 mm and the edge thickness being 0.912 mm. The edge thickness means the thickness measured at the outmost side of the whole lens in the direction of the optical axis.

Quadric surface coefficient values K and different-order aspheric surface coefficients of the surface S1 and the surface S2 of the lens L1 as well as the surface S10 and the surface S11 of the lens L6 are listed in Table IV below, wherein an aspheric surface polynomial may refer to the above formula (1).

TABLE IV

| Aspheric coefficient | | | | |
|---|---|---|---|---|
| | Surface S1 | Surface S2 | Surface S10 | Surface S11 |
| K | 0 | −1.5878E+00 | 0 | 0 |
| A | 1.2337E−02 | 2.2931E−02 | −8.7124E−04 | 1.9133E−03 |
| B | −2.0154E−03 | −2.1819E−03 | 7.3615E−05 | 3.5636E−05 |
| C | 2.8528E−04 | 6.2991E−04 | −5.5620E−06 | 1.5653E−06 |

TABLE IV-continued

| | Aspheric coefficient | | | |
|---|---|---|---|---|
| | Surface S1 | Surface S2 | Surface S10 | Surface S11 |
| D | −3.0528E−05 | −1.6734E−04 | 2.2250E−07 | 8.3618E−08 |
| E | 2.1826E−06 | 3.4071E−05 | | −2.1493E−08 |
| F | −9.0205E−08 | −2.7991E−06 | | 1.1924E−09 |
| G | 1.5862E−09 | | | |

A fixed focus lens according to another embodiment of the present invention will be described below, and the actual design of each component may refer to Table V below.

TABLE V

| Component | Surface | Curvature radius (mm) | Interval (mm) | Refractive index (Nd) | Abbe number (Vd) |
|---|---|---|---|---|---|
| Lens L1 | S1 | 23.74 | 0.50 | 1.67 | 54.78 |
| | S2 | 3.00 | 2.12 | | |
| Lens L2 | S3 | −6.89 | 0.50 | 1.50 | 81.08 |
| Lens L3 | S4 | 4.10 | 2.08 | 2.00 | 29.13 |
| | S5 | −11.65 | 0.79 | | |
| Aperture stop 130 | S6 | Infinite | 0.14 | | |
| Lens L4 | S7 | 10.38 | 0.47 | 1.99 | 16.48 |
| Lens L5 | S8 | 2.76 | 0.89 | 1.88 | 40.77 |
| | S9 | 9.55 | 1.84 | | |
| Lens L6 | S10 | 7.68 | 2.33 | 1.67 | 54.78 |
| | S11 | −6.59 | 4.60 | | |
| Cover glass 140 | S12 | Infinite | 0.75 | 1.52 | 64.17 |
| | S13 | Infinite | 0.20 | | |
| Image sensor 150 | S14 | Infinite | | | |

Figure 3:
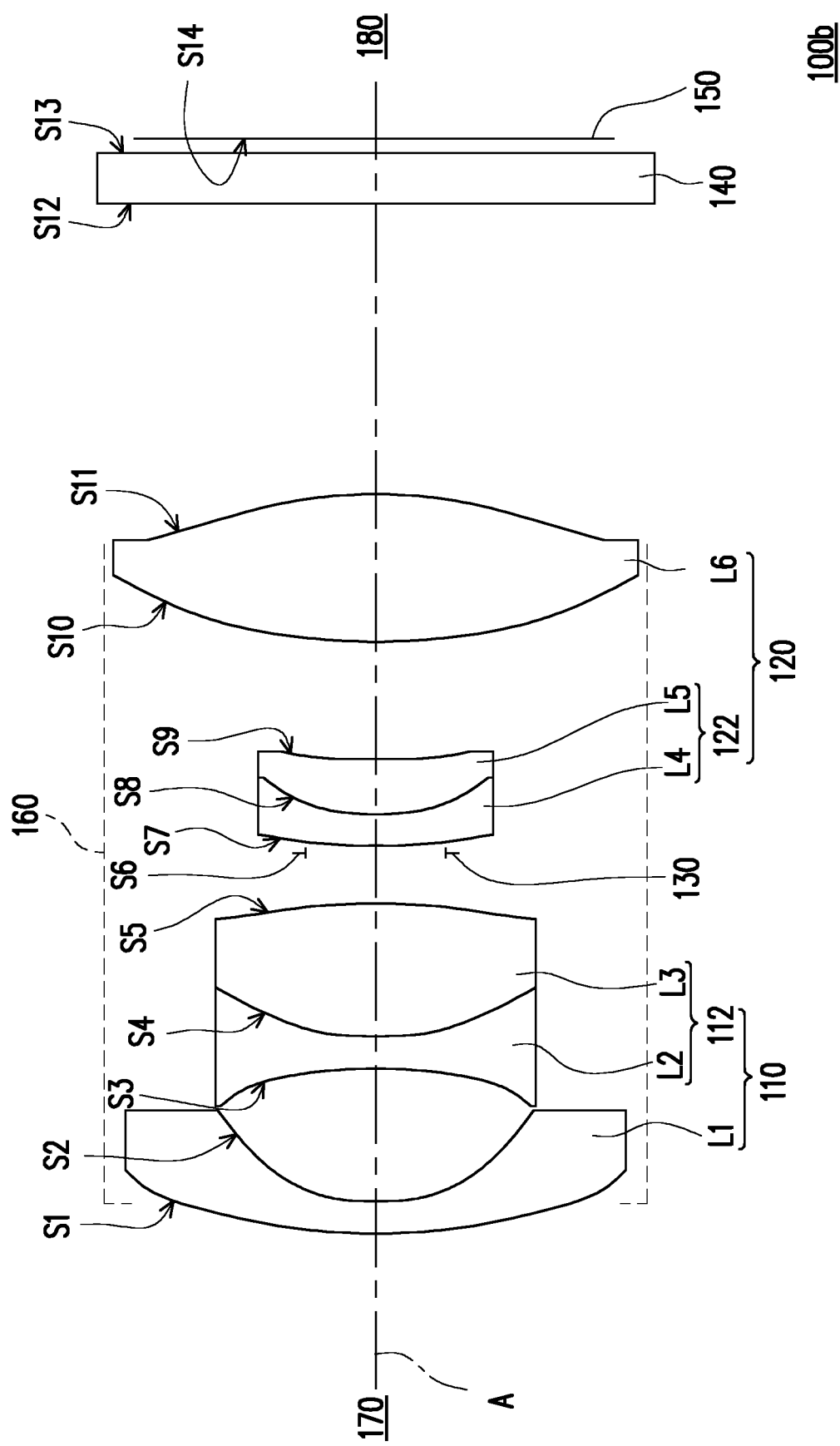
FIG. 3 is a schematic cross-sectional view of a fixed focal imaging lens according to still another embodiment of the present invention.

FIG. 3 is a schematic cross-sectional view of a fixed focal imaging lens according to still another embodiment of the present invention. Referring to FIG. 3 and Table V at the same time, in the fixed focal imaging lens 100b according to the present embodiment, the lens L1 is a negative meniscus lens of which the convex surface faces towards the magnified side 170; the lens L2 is a biconcave lens; the lens L3 is a biconvex lens; the lens L4 is a negative meniscus lens of which the convex surface faces towards the magnified side 170; the lens L5 is a positive meniscus lens of which the convex surface faces towards the magnified side 170; and the lens L6 is a biconvex lens. The lens L1, the lens L2 and the lens L6 are aspheric lenses.

In the embodiment of Table V, the fixed focal imaging lens 100b has the EFL being 3.896 mm, the F# being 3, the TTL being 17.197 mm and the maximum chief ray angle being 10.864 degrees. The material of all the lenses L1-L6 is glass. The lens L1, the lens L2 and the lens L6 are glass molded lenses. The lens L6 has the external diameter being 8.15 mm, the thickness on the optical axis A being 2.329 mm and the edge thickness being 0.812 mm. The edge thickness means the thickness measured at the outmost side of the whole lens in the direction of the optical axis.

Quadric surface coefficient values K and different-order aspheric surface coefficients of the surface S1 and the surface S2 of the lens L1, the surface S3 of the lens L2 as well as the surface S10 and the surface S11 of the lens L6 are listed in Table VI below, where an aspheric surface polynomial may refer to the above formula (1).

TABLE VI

| | Aspheric coefficient | | | | |
|---|---|---|---|---|---|
| | Surface S1 | Surface S2 | Surface S3 | Surface S10 | Surface S11 |
| K | 0 | 0 | 0 | 0 | 0 |
| A | 1.5012E−02 | 1.8143E−02 | −2.6862E−03 | −1.1700E−03 | 1.3840E−03 |
| B | −3.7113E−03 | −2.4926E−03 | −1.4048E−04 | 8.9161E−05 | 1.8147E−05 |
| C | 6.4420E−04 | −1.6223E−04 | 2.9537E−05 | −4.2858E−06 | −1.4441E−07 |
| D | −7.3749E−05 | 1.6239E−04 | −1.7376E−05 | 1.4718E−07 | 8.1050E−08 |
| E | 5.3582E−06 | −1.8915E−05 | | | |
| F | −2.2934E−07 | | | | |
| G | 4.5207E−09 | | | | |

Based on the above, in the fixed focal imaging lens according to the embodiment of the present invention, as the structure with two compound lenses, 2 or 3 aspheric lenses and one aperture stop is adopted, the fixed focal imaging lens is relatively simple in structure and relatively low in sensitivity to assembly and production error, so that the lens is relative easy to produce, the lens assembly yield is high, and the production cost is also reduced.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:
1. A fixed focal imaging lens, comprising the followings sequentially arranged from a magnified side to a minified side:
  a first lens set, comprising the followings sequentially arranged from the magnified side to the minified side:
    a first aspheric lens, being a lens closest to the magnified side in the first lens set; and
    a first compound lens, comprising a plurality of lenses combined together;
  an aperture stop; and
  a second lens set, comprising the followings sequentially arranged from the magnified side to the minified side:
    a second compound lens, comprising a plurality of lenses combined together; and
    a second aspheric lens, being a lens closest to the minified side in the second lens set;
  wherein the number of lenses with refractive power in the fixed focal imaging lens is 6-8,
  wherein the number of aspheric lenses in the fixed focal imaging lens is 2 or 3, and wherein a distance between every two adjacent lenses in the fixed focal imaging lens is fixed during focusing.

2. The fixed focal imaging lens according to claim 1, wherein diameter of the lens closest to the magnified side is smaller than diameter of the lens closest to the minified side.

3. The fixed focal imaging lens according to claim 1, wherein the maximum thickness of the second aspheric lens in the direction of an optical axis is 3 times or more of the minimum thickness of the first aspheric lens in the direction of the optical axis.

4. The fixed focal imaging lens according to claim 1, further comprising a lens barrel accommodating the first aspheric lens, the first compound lens, the aperture stop, the second compound lens and the second aspheric lens, wherein the material of the lens barrel is metal.

5. The fixed focal imaging lens according to claim 1, wherein material of all lens with refractive power in the fixed focal imaging lens is glass.

6. The fixed focal imaging lens according to claim 1, wherein a distance measured along an optical axis, from a surface facing towards the magnified side of the lens closest to the magnified side, to a surface facing towards the minified side of the lens closest to the minified side, is smaller than 20 mm.

7. The fixed focal imaging lens according to claim 1, wherein the fixed focal imaging lens satifies the condition that 1≤|TL/EFL|≤10, wherein TL is a distance measured along an optical axis, from a surface facing towards the magnified side of the lens closest to the magnified side, to a surface facing towards the minified side of the lens closest to the minified side, and EFL is an effective focal length of the fixed focal imaging lens.

8. The fixed focal imaging lens according to claim 1, wherein the first aspheric lens and the first compound lens are overall negative powered, and the second compound lens and the second aspheric lens are overall positive powered.

9. The fixed focal imaging lens according to claim 1, wherein the refractive power of the first aspheric lens, the first compound lens, the second compound lens and the second aspheric lens are sequentially negative, positive, negative and positive.

10. A fixed focal imaging lens, comprising the followings sequentially arranged from a magnified side to a minified side:
   a first aspheric lens, being a lens closest to the magnified side in the fixed focal imaging lens;
   a first compound lens, comprising a plurality of lenses combined together;
   an aperture stop;
   a second compound lens, comprising a plurality of lenses combined together; and
   a second aspheric lens, being a lens closest to the minified side in the fixed focal imaging lens;
   wherein the number of lenses with refractive power in the fixed focal imaging lens is 6-8,
   wherein the number of aspheric lenses in the fixed focal imaging lens is 2 or 3, and
   wherein a distance between every two adjacent lenses in the fixed focal imaging lens is fixed during focusing.

11. The fixed focal imaging lens according to claim 10, wherein diameter of the lens closest to the magnified side is smaller than diameter of the lens closest to the minified side.

12. The fixed focus image pickup lens according to claim 10, wherein the maximum thickness of the second aspheric lens in the direction of an optical axis is 3 times or more of the minimum thickness of the first aspheric lens in the direction of the optical axis.

13. The fixed focal imaging lens according to claim 10, further comprising a lens barrel accommodating the first aspheric lens, the first compound lens, the aperture stop, the second compound lens and the second aspheric lens, wherein the material of the lens barrel is metal.

14. The fixed focal imaging lens according to claim 10, wherein material of all lens with refractive power in the fixed focal imaging lens is glass.

15. The fixed focal imaging lens according to claim 10, wherein a distance measured along an optical axis, from a surface facing towards the magnified side of the lens closest to the magnified side, to a surface facing towards the minified side of the lens closest to the minified side, is smaller than 20 mm.

16. The fixed focal imaging lens according to claim 10, wherein the fixed focal imaging lens satifies the condition that 1≤|TL/EFL|<10, wherein TL is a distance measured along an optical axis, from a surface facing towards the magnified side of the lens closest to the magnified side, to a surface facing towards the minified side of the lens closest to the minified side, and EFL is an effective focal length of the fixed focal imaging lens.

17. The fixed focal imaging lens according to claim 10, wherein the first aspheric lens and the first compound lens are overall negative powered, and the second compound lens and the second aspheric lens are overall positive powered.

18. The fixed focal imaging lens according to claim 10, wherein the refractive power of the first aspheric lens, the first compound lens, the second compound lens and the second aspheric lens are sequentially negative, positive, negative and positive.

* * * * *